US012801773B2

(12) United States Patent
Liao et al.

(10) Patent No.: US 12,801,773 B2
(45) Date of Patent: Nov. 17, 2026

(54) MONITORING AND ANALYSIS SYSTEM AND METHOD THEREOF

(71) Applicant: Dataisec Technology Inc., Taipei City (TW)

(72) Inventors: Chi-Hsiang Liao, Taipei City (TW); Tzu-Te Wang, Taipei City (TW)

(73) Assignee: DATAISEC TECHNOLOGY INC., Taipei City (TW)

( * ) Notice: Subject to any disclaimer, the term of this patent is extended or adjusted under 35 U.S.C. 154(b) by 56 days.

(21) Appl. No.: 18/932,074

(22) Filed: Oct. 30, 2024

(65) Prior Publication Data

US 2025/0139281 A1 May 1, 2025

(30) Foreign Application Priority Data

Nov. 1, 2023 (TW) ................................ 112142114

(51) Int. Cl.
*G06F 21/62* (2013.01)
*G06F 21/55* (2013.01)

(52) U.S. Cl.
CPC ........ *G06F 21/6227* (2013.01); *G06F 21/552* (2013.01)

(58) Field of Classification Search
CPC ..... G06F 21/552; G06F 21/6227; G06F 16/28
USPC ........................................................ 726/2, 27
See application file for complete search history.

(56) References Cited

U.S. PATENT DOCUMENTS

2006/0059154 A1* 3/2006 Raab ................... G06F 21/6227 707/999.009
2012/0117644 A1* 5/2012 Soeder ................. G06F 21/554 726/22
2012/0185911 A1* 7/2012 Polite .................... H04L 63/102 726/1
2016/0085987 A1* 3/2016 Kaliski, Jr. ......... G06F 21/6218 707/694
2016/0366337 A1* 12/2016 Duran .................... G02B 5/208
2017/0104756 A1 4/2017 Rosenthal et al.
2017/0272472 A1* 9/2017 Adhar ................... G06F 21/602
2019/0207969 A1* 7/2019 Brown .................. G06F 21/552
2019/0342304 A1* 11/2019 Weintraub ............ H04L 63/102
2019/0361577 A1* 11/2019 Burns ................ H04N 21/4316
2021/0099483 A1* 4/2021 Shukla .................. G06F 21/566
(Continued)

OTHER PUBLICATIONS

NPL Search Terms (Year: 2026).*
Extended European Search Report for European Application No. 24209504.0, dated Dec. 12, 2024.

*Primary Examiner* — Syed A Zaidi
(74) *Attorney, Agent, or Firm* — Birch, Stewart, Kolasch & Birch, LLP

(57) ABSTRACT

The invention relates to a monitoring and analysis system and method thereof. The monitoring and analysis system connected to an application server, listens to every activity event of applications on the application server, and tokenizes the data content of activity events that need to be monitored to form tokenized data. Subsequently, the tokenized data is edited and processed to form restructured data content, which is then sent back to the application server. The restructured data content is transmitted via the application server to a database server. In this way, the monitoring and analysis system monitors and checks access activities from the application server to the database server, thereby preventing information security issues.

7 Claims, 6 Drawing Sheets

(56) References Cited

U.S. PATENT DOCUMENTS

| | | | | |
|---|---|---|---|---|
| 2021/0117544 | A1* | 4/2021 | Kurtz | G06F 21/566 |
| 2021/0152364 | A1* | 5/2021 | Beecham | G06F 21/64 |

* cited by examiner

MONITORING AND ANALYSIS SYSTEM AND METHOD THEREOF

BACKGROUND OF THE INVENTION

This application claims priority for the TW Application No. 112142114 filed on 1 Nov. 2023, the content of which is incorporated by reference in its entirely.

FIELD OF THE INVENTION

The invention relates to a monitoring and analysis system and method thereof, in particular, to a monitoring and analysis system and method thereof for activity monitoring of a database server.

DESCRIPTION OF THE PRIOR ART

Web servers, application servers, and database servers typically work together in a multi-tier architecture, each playing different roles and working together to provide the functionality of a web application. In addition, according to Amazon's article 'What is the difference between a web server and an application server?', 'A web server hosts websites and provides responses to simple requests. The web server also logs server activity and allows server-side scripting. The application server has a more complex set of tasks. The application server can be connected to enterprise systems, services and databases to process business logic and generate dynamic content.'

The Database Activity Monitoring (DAM) system monitors the access activities of application servers to database servers. A further explanation of DAM is that it is a technology developed specifically to address the security needs of database servers. Currently, DAM products are mainly divided into two types for database access actions and command acquisitions, namely 'network-based' and 'local-based agents'. Network-based DAM has absolutely no impact on the performance of the database server. It can audit the access activities of the database server by monitoring all network packets, but it cannot audit local login actions. The local-based agent DAM can monitor local login actions, but it needs to be run on the database server, which may use a lot of hardware resources and generate a large amount of audit data transmission. It should be noted that if the monitoring software is built into the database server, it does not meet the definition of DAM because they lack the separation of duties and responsibilities and the independence for the nature of audit. In addition, current DAM technology has difficulty in detecting and preventing access by malicious user terminals (also known as clients), or is unable to capture advanced attack techniques such as stored procedures and trigger programs.

Therefore, how to monitor and audit access activities of the database server without affecting the performance of the database server while monitoring local login actions, reducing the use of a large amount of hardware resources and generating a large amount of audit data transmission as well as detecting and preventing malicious users from accessing the terminal and capturing advanced attack techniques is an urgent problem that needs to be solved.

SUMMARY OF THE INVENTION

Therefore, in view of the problems of the prior art, an objective of the invention is to monitor and audit access activities of the database server without affecting the performance of the database server while monitoring local login actions, using a small amount of audit data for transmission as well as detecting and preventing malicious users from accessing the terminal and capturing advanced attack techniques.

According to the objective of the invention, a monitoring and analysis system is provided, wherein the monitoring and analysis system is connected to an application server, and the monitoring and analysis system includes an information security definition module, an information security management module, a service connection module, an event listening module, a data tokenizing module and a data processing module. The information security definition module is configured to define a plurality of information security monitoring events. The information security management module is connected to the information security definition module, and configured to enable or disable an information security monitoring event and set an enabled information security monitoring event as an enabled information security monitoring event, all of the enabled information security monitoring events forming a monitoring list. The service connection module is connected to an application of the application server. The event listening module is connected to the service connection module, the information security management module and the data tokenizing module; the event listening module is configured to receive the monitoring list from the information security management module, listens to each activity event of the application in real time via the service connection module and transmit a data content of the activity event to the data tokenizing module when the activity event belongs to the enabled information security monitoring event. The data tokenizing module tokenizes the data content to form a tokenized data. The data processing module is connected to the data tokenizing module and the service connection module, and configured to edit and process the tokenized data to form a restructured data content and send the restructured data content back to the application server so that the restructured data content is transmitted to a database server via the application server.

The information security definition module further defines a tokenizing action and an editing action for different component segments of the data content of each of the information security monitoring events. The data tokenizing module tokenizes the different component segments of the data content respectively according to the tokenizing action to form the tokenized data. The data processing module edits and processes the different component segments of the tokenized data respectively according to the editing action to form the restructured data content.

The activity event is an event where the application server receives a user terminal to access the database server, the data content is an SQL instruction, and a syntax structure of the SQL instruction includes components such as commands, clauses, operators and functions.

The tokenizing action of the data processing module is to tokenize the SQL instruction, and a method for tokenizing is to add symbols before and after the operator to form the tokenized data.

The editing action of the data processing module is annotating, adding, removing, replacing, modifying, shielding and outputting a captured data for a tokenized part of the SQL instruction.

According to the objective of the invention, a monitoring and analysis method is further provided, wherein a monitoring and analysis system is installed on an application server, and the monitoring and analysis system includes an information security definition module, an information security management module, a service connection module, an event listening module, a data tokenizing module and a data processing module. The application server uses the monitoring and analysis system to perform steps of: connecting the service connection module to an application of the application server; reading, by the event listening module, a monitoring list from the information security management module, wherein the monitoring list is set by at least one information security monitoring event as an enabled information security monitoring event, and is formed by all of the enabled information security monitoring events; listening to, by the event listening module, each activity event of the application server via the service connection module; determining, by the event listening module, whether the activity event belongs to any of the enabled information security monitoring events, and transmitting a data content of the activity event to the data tokenizing module when the activity event belongs to any of the enabled information security monitoring events; tokenizing, by the data tokenizing module, the data content to form a tokenized data; receiving, editing and processing, by the data processing module, the tokenized data to form a restructured data content, and sending, by the data processing module, the restructured data content back to the application server via the service connection module so that the restructured data content is transmitted to a database server via the application server.

When the activity event does not belong to the enabled information security monitoring event, the application of the application server transmits the data content of the activity event to the database server.

The monitoring and analysis system further includes an information security definition module, and the information security definition module defines a plurality of information security monitoring events and a tokenizing action and an editing action for different component segments of the data content of each of the information security monitoring events. The information security management module sets a start command and a close command for each of the information security monitoring events, and before the step of connecting the service connection module to the application of the application server is performed, a process is performed according to a step of adding the information security monitoring event corresponding to the start command to the monitoring list when the information security management module receives the start command.

When the information security management module receives the close command, the information security monitoring event corresponding to the close command is deleted from the monitoring list.

The step of tokenizing, by the data tokenizing module, the data content to form a tokenized data further includes tokenizing, by the data tokenizing module, the different component segments of the data content respectively according to the tokenizing action to form the tokenized data.

The step of editing and processing, by the data processing module, the tokenized data to form a restructured data content further includes editing and processing, by the data processing module, the different component segments of the tokenized data respectively according to the editing action to form the restructured data content.

In summary, the monitoring and analysis system and method thereof are connected to the application server and intercept all activities on the application server; therefore, it is possible to monitor and audit access activities of the database server and local login actions without affecting the performance of the database server.

Moreover, the invention only monitors, tokenizes and edits the enabled information security monitoring events; this process only uses a small amount of resources and a small amount of audit data for transmission, and may detect malicious user terminal access and capture advanced attack techniques to avoid information security problems.

BRIEF DESCRIPTION OF THE DRA WINGS

DESCRIPTION OF THE PREFERRED EMBODIMENTS

Figure 1:
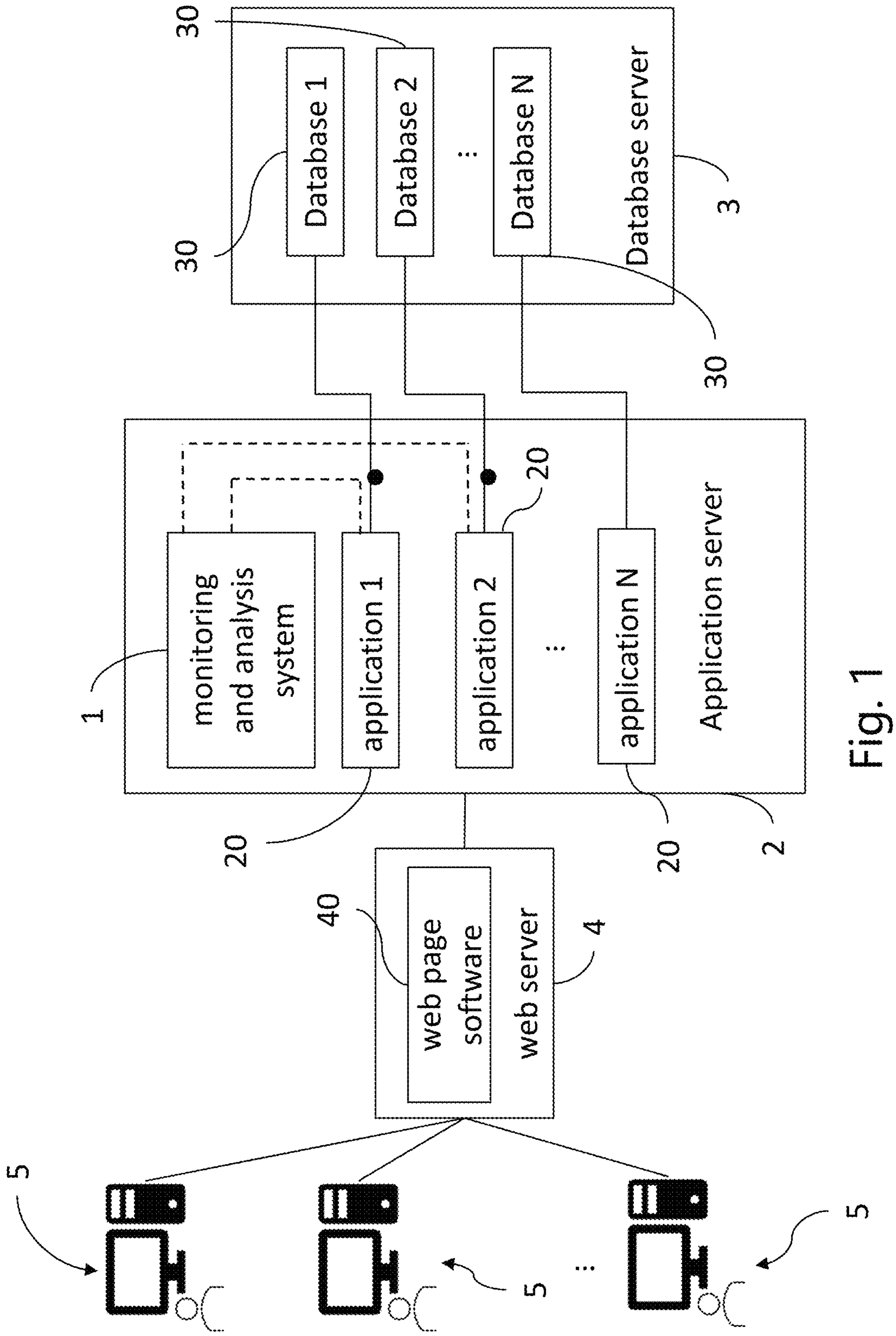
FIG. 1 is a schematic diagram one of a system architecture of the disclosure.

Embodiments of the invention will be further explained with the help of the related drawings below. Wherever possible, in the drawings and the description, the same reference numbers refer to the same or similar components. In the drawings, shapes and thicknesses may be exaggerated for simplicity and convenience. It should be understood that the elements not particularly shown in the drawings or described in the specification have forms known to those skilled in the art. Those skilled in the art can make various changes and modifications based on the content of the invention.

The description below with reference to ‘one embodiment’ or ‘an embodiment’ refers to a particular element, structure or feature associated with at least one embodiment. Therefore, multiple descriptions of ‘one embodiment’ or ‘an embodiment’ appearing in various places below do not refer to the same embodiment. Furthermore, specific components, structures, and features in one or more embodiments may be combined in an appropriate manner.

Figure 2:
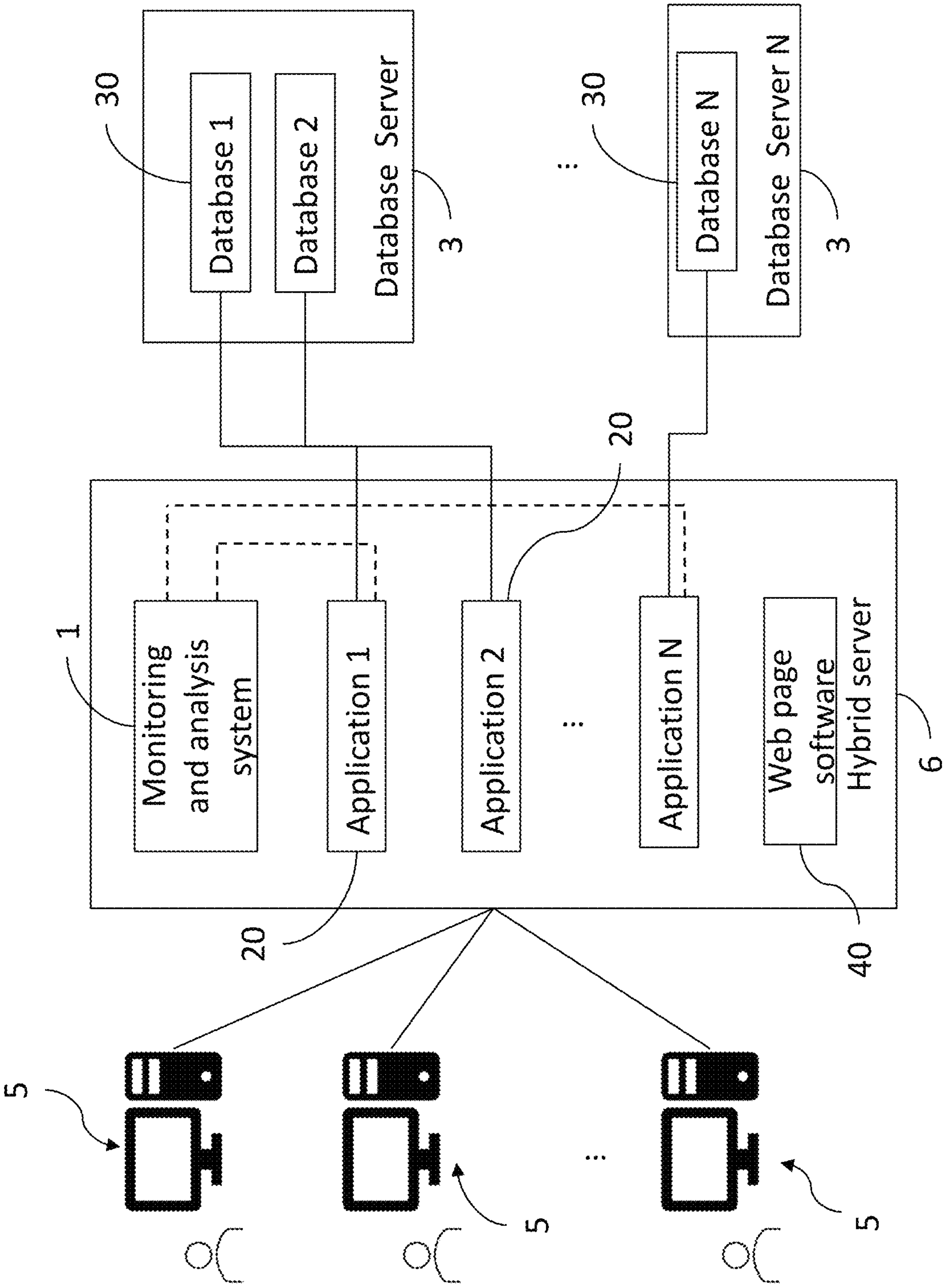
FIG. 2 is a schematic diagram two of a system architecture according to the disclosure.

With reference to FIG. 1, the disclosure is a monitoring and analysis system; the monitoring and analysis system 1 is connected to an application server 2, the application server 2 may be connected to the same database server 3, and different applications 20 of the application server 2 may be connected to different databases 30 in the same database server 3 (as shown in FIG. 1). Or, the application server 2 may be connected to different database servers 3, and different applications 20 of the application server 2 may be connected to different databases 30 in different database servers 3 (as shown in FIG. 2).

Generally speaking, the server on which a web page software 40 is installed is referred to as a web page server 4 (or a Web server); for example, the web page software 40 may be Apache HTTP software from the Apache Software Foundation, Internet Information Server (IIS) software from Microsoft, or Google Web Server software from Google. The server on which the application 20 is installed is referred to the application server 2, and the application server 2 may provide more complex content from databases, services and enterprise systems; for example, the application 20 may be Apache's Tomcat, IBM's WebSphere Application Server, Caucho Technology's Resin, Macromedia's JRun, NEC WebOTX Application Server, JBoss Application Server, Oracle's WebLogic, etc.; the server on which a database program is installed is referred to the database server 3, and the database program may be Oracle, SQL Sever, DB2, MySQL, Sybase, informix or Teradata, etc. and is usually called a database 30.

In the disclosure, the relationship among the web server 4, the application server 2 and the database server 3 is briefly described as follows: the browser of a user terminal 5 requests to access the web server 4 on the Internet or the intranet; the request may be divided into a static resource request and a dynamic resource request, wherein the static resource request refers to resources stored on the Web server that do not change according to user requests, such as HTML files, CSS style sheets, JavaScript scripts, images, video files, etc. When the Web server receives the static resource request, it responds to the browser of the user terminal 5 with the fixed web page content corresponding to the static resource request.

Specifically, when the web server 4 receives a dynamic resource request, it generates resources under specific conditions and generates dynamic web page content to respond to the browser of the user terminal 5. For example, the browser of the user terminal 5 requests to obtain the dynamic resources of the database 30, and the dynamic request is transmitted from the web server 4 to the application server 2; the application server 2 receives the dynamic request and converts it into a dynamic resource syntax request (for example, Servlet, JSP, ASP.NET, PHP or Ruby on Rails, etc.), and sends the dynamic resource syntax request to the database server 3; the database server 3 responds to the application server 2 with the dynamic web page content requested by the dynamic resource syntax, for example: a login web page that requires an account and password to be entered and a dynamic web page generated according to the account authority after a successful login; the application server 2 transmits the dynamic web page content to the web server 4, which then responds to the browser of the user terminal 5 via the web server 4.

With reference to FIG. 2, however, some current practices involve installing the web software 40 and the application 20 together in a server, which is referred to as a hybrid server 6. In addition, people sometimes confuse or mix up the terms 'web server' or 'application server' 2. Therefore, in the disclosure, the application server 2 includes the hybrid server 6, i.e., the hybrid server 6 may obtain the user information of the connected user terminal 5, or the application server 2 obtains the user information of the connected user terminal 5 from the web server 4; for example, the user terminal information may be the content filled in the header field of the user-agent in the HTTP, SIP and SMTP/NNTP protocols, or the Internet Protocol Address (IP Address) of the user terminal 5, or the Media Access Control Address (MAC Address) of the user terminal 5 obtained in the local area network, or the identification information in the header and body of the dynamic resource request (Request) information sent by the application.

Furthermore, it should be noted that there may be a plurality of applications 20 in the application server 2, and each of the applications 20 may access one or more databases 30 in the database server 3. It is also possible that among the plurality of applications 20 on the same application server 2 (or hybrid server 6), some of the applications access databases 30 on different database servers 3 (as shown in FIG. 4).

Figure 3:
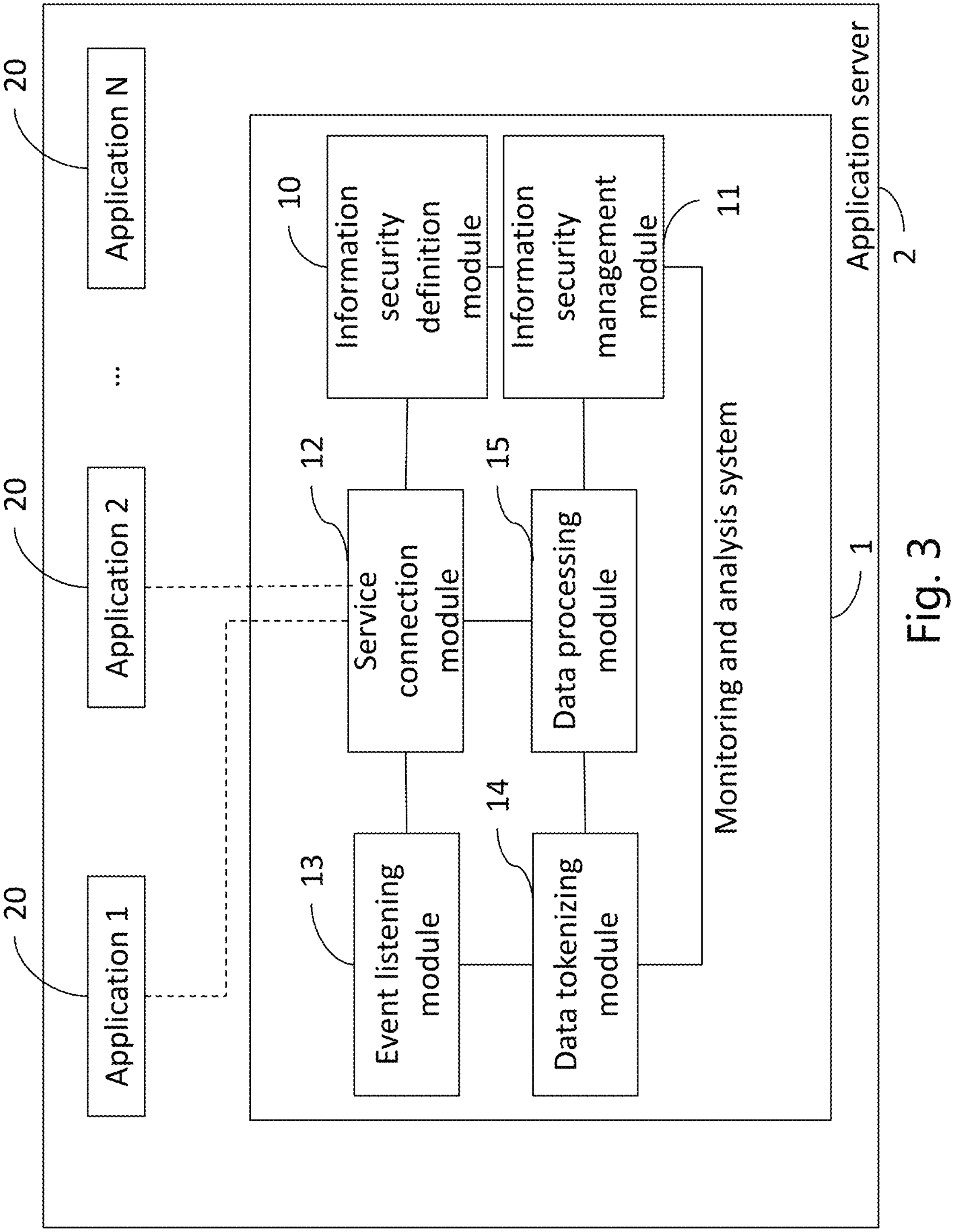
FIG. 3 is a schematic diagram of the connection status between the application program and the monitoring and analysis system in FIG. 1.
Figure 4:
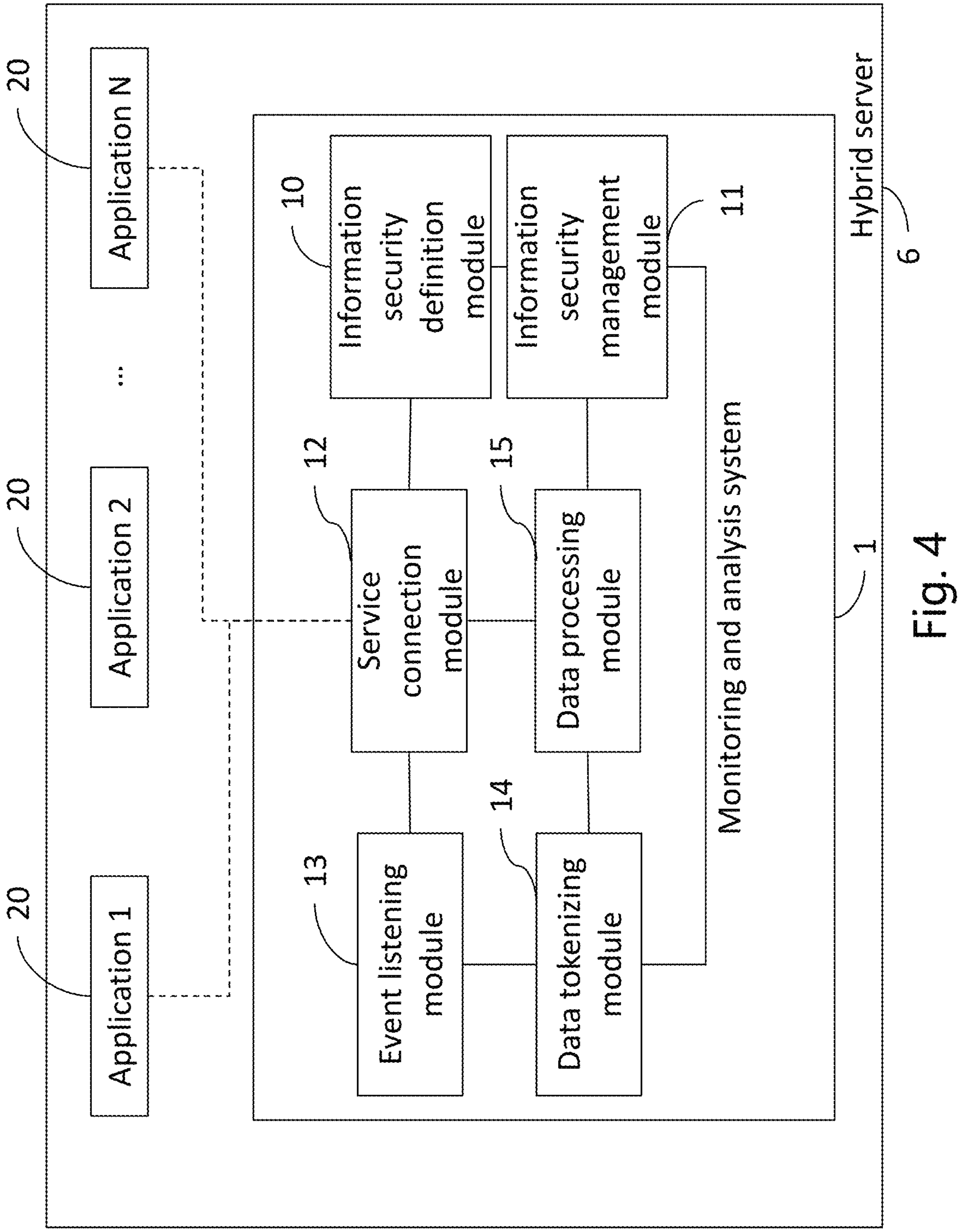
FIG. 4 is a schematic diagram of the connection status between the application program and the monitoring and analysis system in FIG. 2.

With reference to FIGS. 3 and 4, the monitoring and analysis system 1 includes an information security definition module 10, an information security management module 11, a service connection module 12, an event listening module 13, a data tokenizing module 14 and a data processing module 15. The service connection module 12 is connected to one or more applications 20 of the application server 2 (as shown in FIGS. 1 and 2). Alternatively, a plurality of monitoring and analysis systems 1 may be connected to different applications 20 using respective service connection modules 12 on a plurality of application servers or hybrid servers.

In the disclosure, the service connection module 12 is connected to the application server 2 in an intrusive or non-intrusive manner. For example, the service connection module 12 is implanted in the application server 2 by hooking, so as to achieve the purpose of expanding or modifying the original function. There are two common intrusive implementation methods:

modifying the original code of application server 2 and adding the hooking program code directly to the appropriate coding position of application 20, this method requires the application server 2 to obtain access to the original code of the application 20;

dynamically modifying the compiled program code of the application server 2, and injecting the hooking program code when running the application 20, this method requires some decompilation, bytecode injection and other techniques.

There are three non-intrusive implementation methods: the service connection module 12 will use one or a combination of the following hooking program code techniques according to the actual environment and system to achieve the purpose of implanting the application server 2.

By utilizing the extension point (Extension) or plug-in (Plug-in) mechanism provided by the application server 2, the plug-in program code is developed to realize the hooking function.

The configuration, scripts, environment variables, etc. related to the application 20 are modified to achieve the effect of hooking.

By utilizing the hooking technology at the operating system level, the operating system and/or application 20 or calls, function calls, etc. of the application server 2 are intercepted and modified.

When the mechanisms such as the expansion point, the event listener, the filters, etc. provided by the application server 2 are used to develop plug-ins to extend the original functions. The service connection module 12 uses a filter to intercept HTTP requests and obtain information running on the application server 2, for example, by monitoring whether there is an HTTP Get request through the event listener, wherein the program code is excerpted as follows:

```
GET /api/users HTTP/1.1
Host: example.com
User-Agent: Mozilla/5.0 (Windows NT 10.0; Win64; x64)
Accept: application/json Authorization: Bearer
YOUR_ACCESS_TOKEN
```

Or HTTP POST request are intercepted to obtain the user's account and password and other information to be sent to the application server 2, wherein the program code is excerpted as follows:

```
POST /api/users HTTP/1.1
Host: example.com
User-Agent: Mozilla/5.0 (Windows NT 10.0; Win64; x64)
Content-Type: application/json Content-Length: 81
Authorization: Bearer YOUR_ACCESS_TOKEN
{
'Username': 'john_doe',
'email': 'john.doe@example.com',
'password': "securepassword"
  }
```

Or customized workflows are inserted through filters provided by the system; taking the application 20 named Tomcat as an example, a custom ServletFilter filter code is created to intercept and process requests corresponding to the Uniform Resource Locator (URL):

```
<filter>
<filter-name>HttpHookFilter</filter-name>
<filter-class>com.example.HttpHookFilter</filter-class>
</filter>
<filter-mapping>
<filter-name>HttpHookFilter</filter-name>
<url-pattern>/*</url-pattern>
</filter-mapping>
```

The application 20 running on the Tomcat application server implements a Lifecyclelistener and establishes an interface that implements the Lifecyclelistener. When Tomcat is started or terminated, the hooking program code may be executed through the lifecycle method in the Lifecyclelistener.

```
<Listener
  className="com.example.ServerHookListener"/>
```

Another non-invasive technology is to use the system's own operating processes and components to extract information, such as:

Injecting a dynamic-link library (DLL) intercepts the system's Application Programming Interface (API) calls to hook program code processes. Hooking the interface of the application 20 such as socket, file I/O and other functions, or injecting DLL and hooking the function call of the application 20 for interception; in this way, the data object of the application 20 during operation may be obtained, and then the required data content may be obtained according to the structure format of the obtained data object, or the customized content may be modified or added to the data object to achieve the purpose of dynamic capture and change. The DLL interception method will select different DLLs depending on the system or the data component to be intercepted.

Directly modifying the system call: by modifying the system call table, the system call of the application 20 is directly directed to the hooked function; for example, by hooking the connect system call of the socket, when the application 20 establishes a connection, the hooking program code is first run, and then the original address is connected.

Global hooking technology: the global hooking technology refers to the hooking technology that can intercept all function calls in the target process. There are two implementation principles:

Using Microsoft's software development tool called Detours to hook; Detours provides a series of APIs to intercept the DLL export table, thereby realizing the global hooking of any DLL. The usage is:

calling Detours' API to attach the target DLL;

hooking the function address of the DLL and customizing the function implementation;

in the custom function, executing the hooking program code first, then calling the original function;

when the hooking is not needed, calling Detours API to detach.

The other is an open source software called EasyHook API. EasyHook is similar to Detours and also implements global hooking by intercepting the DLL export table. The steps to use EasyHook are:

inheriting the abstract class provided by EasyHook to implement the hooking function;

inserting a custom program code into the hooking function;

using EasyHook API to set the hooking;

when completed, calling unhook API to restore the original state;

taking Windows platform as an example, the ReadFile function in the application 20 interface of the Windows software may be hooked to record the file information before reading the data. Or the 'send' instruction in the 'socket' function is hooked and the content of the 'send' instruction is parsed.

Another way to hook is to modify system configuration, scripts, environment variables, etc. to achieve the hooking effect, such as the following example:

Modifying the configuration file; most application servers 2 rely on the configuration file to run. Modifying the relevant configuration may change the running logic of the application 20. For example, in Tomcat's server.xml, requests may be intercepted by adding a custom Valve, such as the following program code, so that when the Tomcat application 20 is started, this hooking value will be loaded and the program code will be executed:

```
<Valve className="com.example.HookValve"/>
```

Modifying the startup script (script), modifying the application 20 startup script, and inserting the custom program code during the startup process. For example, the following code is inserted into the catalina.sh script of Tomcat application 20:

```
export HOOK_OPTS="-Dhook.param=enabled"
```

This will set a system property when the Java Virtual Machine (JVM) starts, and the application 20 may perform the hooking based on this property.

Setting environment variables and triggering the hooking through environment variable events:

```
export APP_HOOKED=true
```

The application 20 detects this variable when being started, and executes the hooking logic when being true.

In the disclosure, the information security definition module 10 defines a plurality of information security monitoring events, wherein the plurality of information security monitoring events include but are not limited to SQL hidden code attacks, malware penetration, abuse of legal rights, or user operations such as click, change or data transfer with the server such as request events; the listen mechanism may be used to confirm the activity events and corresponding programs are executed after the events are triggered. Therefore, the information security definition module 10 further defines the marking action and the editing action of different component segments of the data content of each of the information security monitoring events, so as to execute corresponding programs after being triggered. The data tokenizing module 14 tokenizes the different component segments of the data content respectively according to the tokenizing action to form the tokenized data; further, a method for tokenizing is to add symbols before and after the operator to form the tokenized data. The data processing module 15 edits and processes the different component segments of the tokenized data respectively according to the editing action to form the restructured data content. Moreover, the editing action of the data processing module 15 is annotating, adding, removing, replacing, modifying, shielding and outputting a captured data for a tokenized part of the SQL instruction.

In the disclosure, the information security management module 11 is connected to the information security definition module 10, and the information security management module 11 is configured to enable or disable an information security monitoring event and set an enabled information security monitoring event as an enabled information security monitoring event, all of the enabled information security monitoring events forming a monitoring list. Further, the information security management module 11 manages the information security projects and various activity event projects that the event listening service module must monitor when executing, and defines the subsequent processing methods of the monitored activity events and the output destination of the captured data. The information security management module 11 may provide a visual setting page for managing the enabling or the disabling of the information security monitoring events.

The setting files of different information security management modules 11 may also be different. For example, taking the database 30 as an example, the activity event mainly monitors the actions of database 30 (such as query, update, delete, etc.). The program syntax is excerpted as follows:

```
{
  'system'' : {
    'name'' : ''UserDatabase'' ,
    'version'' : ''1.2.3''
  } ,
  'events'' : {
    'login'' : {
      'severity'' : ''medium''
    } ,
    'query'' : {
      'severity'' : ''high''
    } ,
    'update'' : {
      'severity'' : ''high''
    } ,
    'delete'' : {
      'severity'' : ''critical''
    }
  } ,
  'enabled_events'' : [
    'login'' ,
    'query'' ,
    'update''
  ]
}
```

If application services are taken as an example, the focus will be on user action and related activity events. The program syntax is excerpted as follows:

```
{
  'sstem' :{
    'name'' : ''AppService'' ,
    'version'' : ''2.0''
  } ,
  'events'' : {
    'http_request'' : {
```

-continued

```
      'severity'' : ''medium''
    } ,
    'user_login'' : {
      'severity'' : ''medium''
    } ,
    'payment_transaction'' : {
      'severity'' : ''high''
    }
  } ,
  'enabled_events'' : [
    'http_request'' ,
    'user_login''
  ]
}
```

The sample data above includes the following enabled information security monitoring events:

the target system name and version number are in the 'system' block;

the operating system type and version number is in the 'os' block;

in events, all supported event name tags are listed;

the event monitoring items to be enabled are listed in 'enabled_events'.

In other words, the information security management module 11 may select the information security monitoring events to be enabled according to the needs, form a monitoring list, and provide to the event listening module 13 through API or setting files. The event listening module 13 service reads the enabled information security monitoring events set in the monitoring list.

The event listening module 13 is connected to the service connection module 12, the information security management module 11 and the data tokenizing module 14; the event listening module 13 is configured to receive the monitoring list from the information security management module 11, the event listening module 13 listens to each activity event of the application 20 in real time via the service connection module 12 and the event listening module 13 transmit a data content of the activity event to the data tokenizing module 14 when the activity event belongs to the enabled information security monitoring event. The data processing module 15 sends the restructured data content back to the application server 2 via the service connection module 12 so that the restructured data content is transmitted to a database server 3 via the application server 2.

In some embodiments of the invention, the event listening module 13 is a program code written according to the type of the application server 2, and uses different hooking technologies for different systems and services to be monitored to provide monitoring actions for the application server 2; the event listening module 13 may be automatically started when the application 20 is started based on the hooking technology; the event listening module 13 starts the operation by first reading the monitoring list set by the information security management module 11, and starts each of the enabled information security monitoring events in sequence or synchronously according to the monitoring list, and continues until the application 20 is closed or stopped; the event listening module 13 will periodically read the monitoring list to determine whether it is necessary to start other monitoring services or to close the currently executing monitoring services.

In some embodiments of the invention, taking the activity event is an event where the application server 2 receives a user terminal 5 to access the database server 3 as an example, the data content is an SQL instruction, and a syntax structure of the SQL instruction includes components such as commands, clauses, operators and functions. For example, a complete SQL command is as follows:

SELECT name, phone, address FROM users WHERE name=‘John’

The tokenizing action of the data processing module 15 is to tokenize the information before and after the operator of the SQL instruction. The result after tokenization is as follows:

SELECT <name_token>, <phone_token>, <address_token> FROM <table_token> WHERE <name_token>=‘<user_token>’

In other words, the tokenizing action is as follows:

the value of the ‘name’ field, ‘John’, is replaced with <user_token>;

the ‘users table’ is replaced by <table_token>;

the field names ‘name’, ‘phone’, and ‘address’ are replaced with <name_token>, <phone_token>, and <address_token>.

The ‘name’, ‘users table’, ‘name’, ‘phone’, ‘address’ and other fields are tokenized by adding <> and other tokens before and after; sensitive information in SQL commands, such as names and table names, are replaced with anonymous tokens to improve security; the subsequent data processing module 15 only needs to compare the structure to see if it matches the structure after the tokenization to determine whether it meets the editing and processing required for the information security processing operation.

The information security management module selects to enable one or more detection events based on demand. Each of the tokenized detection events may be identified based on different event tokens, such as database query (Query), application software events such as login (Login), etc., and further set the processing mode corresponding to the event. Taking the following SQL instruction as an example:

‘Select user, name, phone, address, table from users’

The SQL instructions are determined through database query events (db_query) and require tagging. The information before and after the operator of the SQL instruction is tokenized. The objects to be tagged include user, name, phone, address, table. Then the corresponding job will be executed according to the editing action defined later. The first editing action is to block the user name through the regular expression ‘/(\S+?) \S+? (\S+)/’ to determine what part needs to be blocked, and then replace it with the defined character ‘O’ (for example, ‘WANG, XIAO-MING’ is replaced with ‘WANG, O, MING’); next, the data of the phone number ‘phone’ is deleted. The regular expression defines <phone>, so the phone data will be deleted and not returned. The following is the program code for tokenizing and editing actions:

```
{
  'tokens": [
    {"name": "username", "type": "user_identity"},
    {"name": "password", "type": "credential"},
    {"name": "amount", "type": "transaction_data"},
            {"name": "table_name", "type": "db_object"},
    {"name": "column_name", "type": "db_object"},
    {"name": "ip_address", "type": "client_info"},
    {"name": "user_agent", "type": "client_info"},
            {"name": "name", "type": "user_data"},
    {"name": "phone", "type": "user_data"},
    {"name": "address", "type": "user_data"},
    {"name": "table", "type": "db_object"},
    {"name": "user", "type": "user_identity"}
  ],
  'events": {
```

-continued

```
        'db_query": {
    'tokens": ["name", "phone", "address", "table", "user"],
      'actions": [
        {"type": "mask", "target": "user", "regex":
"/(\\S+?)\\S+?(\\S+)/", "replaceby" : "O"}
        {"type": "delete", "target": "phone", "regex":
        "<phone>"}
      ]
    }
  }
}
```

Further, in order to record the SQL instructions executed by the user terminal 5, annotations are used to add annotations before the SQL instructions, and the user information of the client of the application 20 are added to the annotations, including but not limited to user name, account, id, email, ip, etc., for example:

original SQL instruction: select * from account;

rewritten SQL instruction:/* user: admin */select * from account.

Moreover, in order to analyze and intercept SQL instructions with security information concerns, the original SQL instructions are annotated and safe SQL instructions are executed, for example:

original SQL instruction: select * from account WHERE id=1 OR 1=1;

rewritten SQL instruction: select ‘warning_sql_injection’/*select * from account WHERE id=1 OR 1=1*/.

In addition, for SQL instructions that may raise security information concerns, the original SQL will be shielded, for example:

original SQL instruction: select name, password from user;

rewritten SQL instruction: select name/*, password*/from user.

Figure 5:
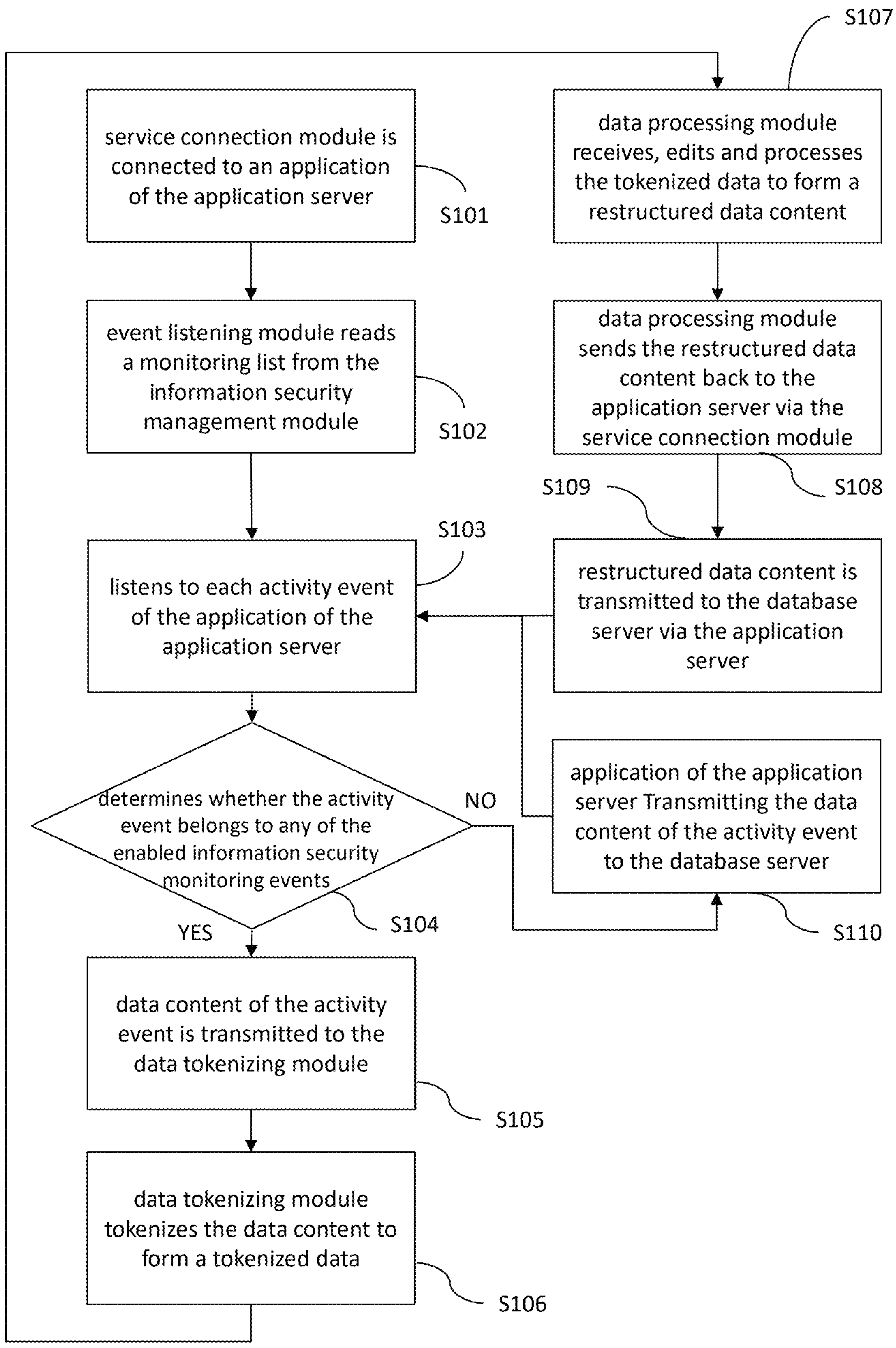
FIG. 5 is a flow chart of a method according to the disclosure.
Figure 6:
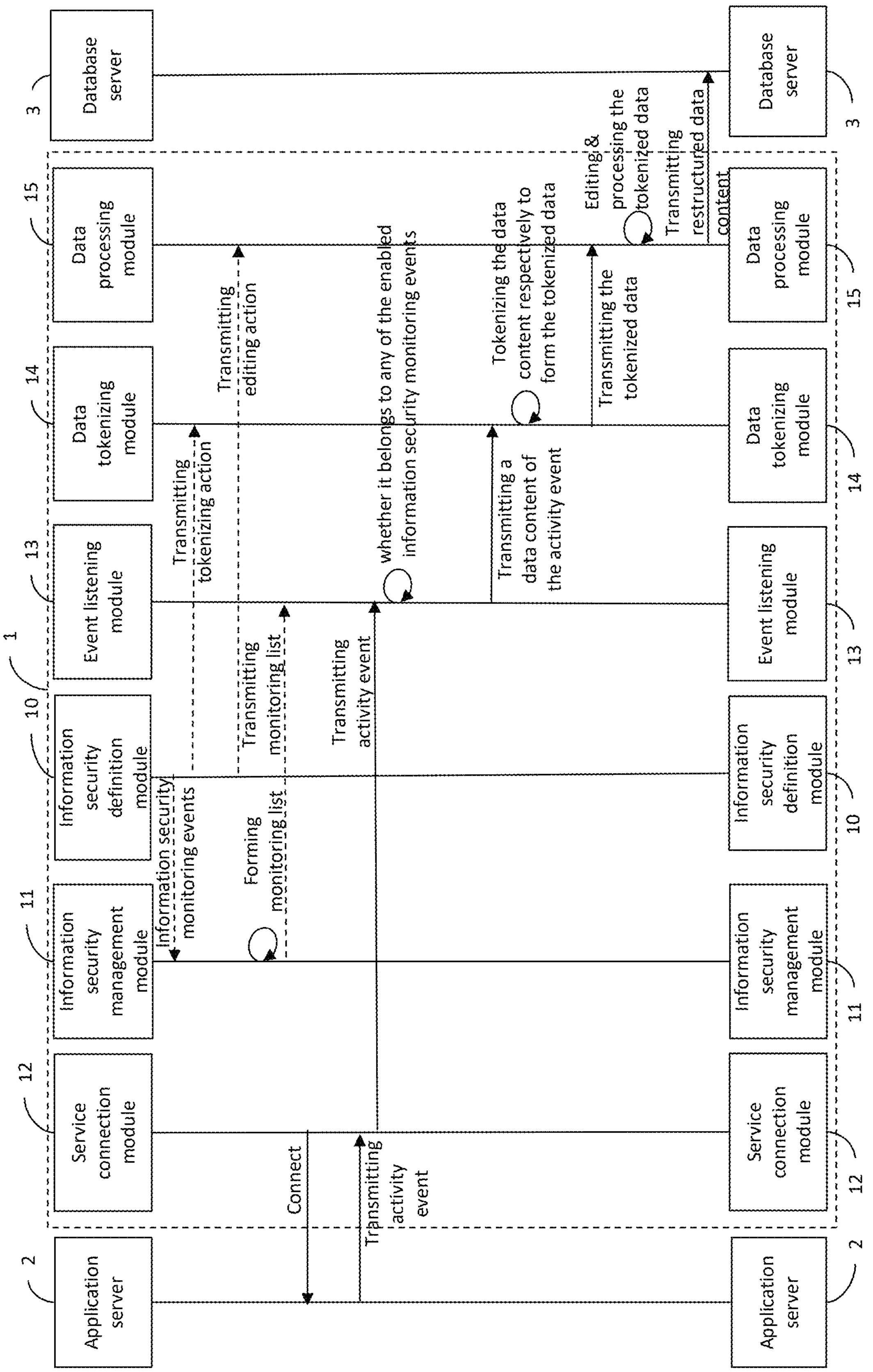
FIG. 6 is a timing diagram of the method according to the disclosure.

With reference to FIGS. 5 and 6, the disclosure provides a monitoring and analysis method, wherein the monitoring and analysis system 1 is installed in an application server 2, and the monitoring and analysis system 1 includes an information security management module 11, a service connection module 12, an event listening module 13, a data tokenizing module 14 and a data processing module 15; the application server 2 uses the monitoring and analysis system 1 to perform the following steps:

(S101) the service connection module 12 is connected to an application 20 of the application server 2;

(S102) the event listening module 13 reads a monitoring list from the information security management module 11, wherein the monitoring list is set by at least one information security monitoring event as an enabled information security monitoring event, and is formed by all of the enabled information security monitoring events;

(S103) the event listening module 13 listens to each activity event of the application 20 of the application server 2 via the service connection module 12;

(S104) the event listening module 13 determines whether the activity event belongs to any of the enabled information security monitoring events, wherein when the activity event belongs to any of the enabled information security monitoring events, the method proceeds to step (S105), otherwise the method proceeds to step (S110);

(S105) a data content of the activity event is transmitted to the data tokenizing module 14;

(S106) the data tokenizing module 14 tokenizes the data content to form a tokenized data;

(S107) the data processing module 15 receives, edits and processes the tokenized data to form a restructured data content;

(S108) the data processing module 15 sends the restructured data content back to the application server 2 via the service connection module 12;

(S109) the restructured data content is transmitted to the database server 3 via the application server 2, and then processed according to the steps starting from step S103;

(S110) when the activity event does not belong to the enabled information security monitoring event, the application 20 of the application server 2 transmits the data content of the activity event to the database server 3, and then the process is performed according to the steps starting from step S103.

In some embodiments of the invention, the monitoring and analysis system 1 further includes an information security definition module 10, and the information security definition module 10 defines a plurality of information security monitoring events and a tokenizing action and an editing action for different component segments of the data content of each of the information security monitoring events. The information security management module 11 sets a start command and a close command for each of the information security monitoring events, and before the step of connecting the service connection module 12 to the application 20 of the application server 2 is performed, a process is performed according to a step of adding the information security monitoring event corresponding to the start command to the monitoring list when the information security management module 11 receives the start command. When the information security management module 11 receives the close command, the information security monitoring event corresponding to the close command is deleted from the monitoring list.

In some embodiments of the invention, the step of tokenizing, by the data tokenizing module 14, the data content to form a tokenized data further includes tokenizing, by the data tokenizing module 14, the different component segments of the data content respectively according to the tokenizing action to form the tokenized data. The step of editing and processing, by the data processing module 15, the tokenized data to form a restructured data content further includes editing and processing, by the data processing module 15, the different component segments of the tokenized data respectively according to the editing action to form the restructured data content.

In summary, the monitoring and analysis system 1 and method thereof are connected to the application server 2 and intercept all activities on the application server 2; therefore, it is possible to monitor access activities of the database server 3 and local login actions without affecting the performance of the database server 3. Moreover, the disclosure only monitors, tokenizes and edits the enabled information security monitoring events; this process only uses a small amount of resources and a small amount of audit data for transmission, and may detect malicious user terminal 5 access and capture advanced attack techniques to avoid information security problems.

The above description is only to illustrate the preferred implementation mode of the invention, and is not intended to limit the scope of implementation. All simple replacements and equivalent changes made according to the patent scope of the invention and the content of the patent specification all belong to the scope of the patent application of the invention.

What is claimed is:

1. A monitoring and analysis system, connected to an application server, the application server being connected to a database server, the application server receiving a dynamic request, converting the dynamic request into a dynamic resource syntax request and sending the dynamic resource syntax request to the database server, the database server responding to the application server with a dynamic web page content of the dynamic resource syntax request, the monitoring and analysis system comprising:

an information security definition module, implemented by program code, and configured to define a plurality of information security monitoring events, wherein the information security definition module further defines a tokenizing action and an editing action for different component segments of a data content of each of the information security monitoring events;

an information security management module, connected to the information security definition module, implemented by program code, and configured to enable or disable the plurality of information security monitoring events and set the information security monitoring events that are enabled as an enabled information security monitoring event respectively, all of the enabled information security monitoring events forming a monitoring list;

a service connection module, implemented by program code, and configured to intrusively or non-intrusively hook an application connected to the application server to intercept all activities on the application server, wherein the service connection module performs the hooking by at least one of: (i) modifying the original code of the application server and adding the hooking program code to an appropriate coding position of the application; (ii) dynamically modifying the compiled program code of the application server and injecting the hooking program code when running the application; (iii) utilizing an extension point or plug-in mechanism provided by the application server to develop plug-in program code to realize the hooking function; (iv) modifying configuration, scripts, or environment variables related to the application to achieve the effect of hooking; or (v) utilizing hooking technology at the operating system level to intercept and modify calls or function calls of the application server;

an event listening module, connected to the service connection module, implemented by program code, and configured to receive the monitoring list from the information security management module, listen to each activity event of the application in real time via the service connection module and transmit the data content of each activity event when each activity event belongs to one of the enabled information security monitoring events in the monitoring list, wherein the data content of the activity event is the dynamic resource syntax request, wherein the event listening module starts the operation by first reading the monitoring list set by the information security management module, starts each of the enabled information security monitoring events in sequence or synchronously according to the monitoring list, and continues until the application is closed or stopped; wherein the event listening module periodically read the monitoring list to determine whether to start additional monitoring services or close currently executing monitoring services until the application is closed or stopped;

a data tokenizing module, connected to the event listening module, implemented by program code and configured to receive the data content, wherein the data tokenizing module tokenizes the different component segments of the data content respectively according to the tokenizing action, and a method for tokenizing is to add symbols before and after the operator of the data content to form a tokenized data as an output of the data tokenizing module; and a data processing module, connected to the data tokenizing module and the service connection module, implemented by program code, and configured to receive the tokenized data from the data tokenizing module and to the tokenized data to form a restructured data content, wherein the data processing module edits and processes the different component segments of the tokenized data respectively according to the editing action, and the editing action is one or more of annotating, adding, removing, replacing, modifying, shielding and outputting a captured data for a tokenized part of the data content, and send the restructured data content back to the application server via the service connection module so that the restructured data content is then transmitted to a database server via the application server.

2. The monitoring and analysis system according to claim 1, wherein the activity event is an event where the application server receives at least one user terminal to access the database server, the data content is an SQL instruction, and a syntax structure of the SQL instruction comprises commands, clauses, operators and functions.

3. The monitoring and analysis system according to claim 2, wherein the tokenizing action of the data processing module is to tokenize the SQL instruction, and a method for tokenizing is to add symbols before and after the operator to form the tokenized data.

4. A monitoring and analysis method, installing a monitoring and analysis system on an application server, the monitoring and analysis system comprising an information security management module, a service connection module, an event listening module, a data tokenizing module and a data processing module, the application server using the monitoring and analysis system to perform steps of:

connecting the service connection module to an application of the application server so as to intercept all activities on the application server, wherein the connecting comprises at least one of: (i) modifying the original code of the application server and adding the hooking program code to an appropriate coding position of the application; (ii) dynamically modifying the compiled program code of the application server and injecting the hooking program code when running the application; (iii) utilizing an extension point or plug-in mechanism provided by the application server to develop plug-in program code to realize the hooking function; (iv) modifying configuration, scripts, or environment variables related to the application to achieve the effect of hooking; or (v) utilizing hooking technology at the operating system level to intercept and modify calls or function calls of the application server;

reading, by the event listening module, a monitoring list from the information security management module, wherein the monitoring list is formed by all enabled information security monitoring events, and the enabled information security monitoring event is set by at least one information security monitoring event, wherein the information security definition module further defines a tokenizing action and an editing action for different component segments of the data content of each of the information security monitoring events;

listening to, by the event listening module, each activity event of the application server via the service connection module in real time, wherein the event listening module starts the operation by first reading the monitoring list set by the information security management module, starts each of the enabled information security monitoring events in sequence or synchronously according to the monitoring list, and continues until the application is closed or stopped; the event listening module will periodically read the monitoring list to determine whether it is necessary to start other monitoring services or to close the currently executing monitoring services;

determining, by the event listening module, whether the activity event belongs to any of the enabled information security monitoring events;

transmitting a data content of the activity event to the data tokenizing module when the activity event belongs to any of the enabled information security monitoring events;

tokenizing, by the data tokenizing module, the data content to form a tokenized data, wherein the data tokenizing module tokenizes the different component segments of the data content respectively according to the tokenizing action, and a method for tokenizing is to add symbols before and after the operator to form the tokenized data;

receiving, editing and processing, by the data processing module, the tokenized data to form a restructured data content, wherein the data processing module edits and processes the different component segments of the tokenized data respectively according to the editing action to form the restructured data content, and the editing action is one or more of annotating, adding, removing, replacing, modifying, shielding and outputting a captured data for a tokenized part of the data content;

sending, by the data processing module, the restructured data content back to the application server via the service connection module so that the restructured data content is then transmitted to a database server via the application server.

5. The monitoring and analysis method according to claim 4, wherein when the activity event does not belong to one of the plurality of enabled information security monitoring events, the application of the application server transmits the data content of the activity event to the database server.

6. The monitoring and analysis method according to claim 4, wherein the information security management module sets a start command and a close command for each of the information security monitoring events, and before the step of connecting the service connection module to the application of the application server is performed, a process is performed according to a step of adding the information security monitoring event corresponding to the start command to the monitoring list when the information security management module receives the start command.

7. The monitoring and analysis method according to claim 6, wherein when the information security management module receives the close command, the information security monitoring event corresponding to the close command is deleted from the monitoring list.

* * * * *